US005548950A

United States Patent [19]

Paweletz

[11] Patent Number: 5,548,950
[45] Date of Patent: Aug. 27, 1996

[54] MOTOR FOR A SHAFTLESS SPINNING ROTOR FOR AN OPEN-END SPINNING MACHINE

[75] Inventor: Anton Paweletz, Fellbach, Germany

[73] Assignee: SKF Textilmaschinen-Komponenten GmbH, Stuttgart, Germany

[21] Appl. No.: 350,673

[22] Filed: Dec. 7, 1994

[30] Foreign Application Priority Data

Dec. 14, 1993 [DE] Germany .......................... 43 42 584.4

[51] Int. Cl.$^6$ ..................................................... D01H 4/14
[52] U.S. Cl. ............................................... 057/406; 057/100
[58] Field of Search ........................... 57/100, 406, 404, 57/414

[56] References Cited

U.S. PATENT DOCUMENTS

| | | | |
|---|---|---|---|
| 4,022,008 | 5/1977 | Pimiskern et al. | 57/100 |
| 4,306,166 | 12/1981 | Quandt | 57/100 X |
| 4,543,780 | 10/1985 | Müller et al. | 57/100 X |

FOREIGN PATENT DOCUMENTS

| | | |
|---|---|---|
| 0190440A2 | 12/1985 | European Pat. Off. . |
| 2453762A1 | 7/1975 | Germany . |
| 2437667 | 2/1976 | Germany . |
| 2519651A1 | 11/1976 | Germany . |
| 655006A1 | 8/1977 | Germany . |
| 2433712B2 | 3/1978 | Germany . |
| 3141841C2 | 9/1989 | Germany . |
| 4104250A1 | 8/1992 | Germany . |
| 4207673C1 | 3/1993 | Germany . |
| 57-97919A | 6/1982 | Japan . |
| 62-266222A | 11/1987 | Japan . |
| 1687660 | 10/1991 | U.S.S.R. .................... 57/100 |
| 2165592 | 10/1984 | United Kingdom . |
| WO92/01097 | 1/1992 | WIPO . |

*Primary Examiner*—Joseph J. Hail, III
*Attorney, Agent, or Firm*—Shefte, Pinckney & Sawyer

[57] ABSTRACT

A shaftless spinning rotor for an open-end spinning machine advantageously protects the rotational bearing components in a combined magnetic-gas bearing management by utilizing a concentric magnet arrangement for the generation of a magnetic field for guiding the rotor relative to the stator, wherein a first dynamically balanced magnet unit projects from one of two opposed bearing faces on the rotor and the stator and a corresponding dynamically balanced magnet unit is recessed in the opposite bearing surface, the magnet units being dimensioned to produce an axial as well as a radial air gap therebetween. Air nozzles for producing the gas bearing open into the recessed area. The air gap in the area of the central axis can be embodied to be wider than the air gap between the opposed bearing faces.

11 Claims, 1 Drawing Sheet

MOTOR FOR A SHAFTLESS SPINNING ROTOR FOR AN OPEN-END SPINNING MACHINE

FIELD OF THE INVENTION

The invention relates to a single-motor drive for a shaftless spinning rotor for an open-end spinning machine, which is embodied as the armature, i.e., the rotor, of an axial field motor, wherein the rotor has a bearing surface facing away from its spinning chamber and the stator has an opposed facing bearing surface spaced apart by an air gap, with means producing magnetic fields for driving and guiding the rotor to create a combination magnetic-gas bearing and means for directing the magnetic flux of the magnetic drive and guide fields, and wherein a magnetic arrangement concentric to the rotor axis is provided for generating the magnetic guide fields.

BACKGROUND OF THE INVENTION

As development of rotor spinning machines progresses, the goal is not only to improve the quality of the yarns produced, but above all to increase production capacity. A key factor in increasing production capacity is the rotary speed of the spinning rotor. For this reason, varied kinds of drives and bearings for spinning rotors have been developed, in order to reach rotary speeds of markedly over 100,000 rpm. Reducing the rotor diameter and mass and lowering friction losses enables not only greater rotary speed but also reduced energy consumption when driven.

In this respect, a shaftless spinning rotor, which is embodied as the rotor of an axial field motor, can be considered especially advantageous by providing a combined magnetic and gas bearing which assures relatively low friction losses.

Shaftless spinning rotors, as initially developed (as disclosed for example in German Patent Publication DE 24 37 667 B2), included a set of magnetic windings disposed along a conically extending circumferential surface at the periphery of a spinning rotor. In contrast, axial field motors have proven to be advantageous in respect to the simplicity of their structures and simplified mounting.

For example, German Patent Publication DE 42 07 673 C1 discloses an axial field motor having a guide magnet arrangement disposed at the center of the rotor and the stator, which generates axial and radial forces and provides a dependable guidance for the spinning rotor. The rotor and stator are kept spaced apart by means of an air or gas cushion emitted from air nozzles associated with the bearing arrangement to act in opposition to the attractive magnetic force. However, under extreme conditions producing, for example, an imbalance of the rotor, the guiding force of the guide magnet arrangement may be insufficient to maintain the rotor in axial alignment with the stator. Accordingly, such known spinning rotors may be surrounded by a guide ring at an annular gap to limit the amount of possible rotor deflection. This safety measure is necessary in order to limit extensive damage during such extreme cases. Since the air gap between the bearing surfaces is very small, i.e., usually less than 1 mm, damage to the very delicate nozzle outlets of the gas nozzles can still occur in case of dirt accumulation or heat expansion in the central area of the bearing. In particular, the air essentially flows radially through the air gap to the exterior of the spinning rotor, so that in the center area cooling by means of the outflowing gas is less and dirt cannot be conveyed out from this area as effectively. In addition, the gas cannot flow off straight because of the mentioned guide ring.

SUMMARY OF THE INVENTION

It is therefore an object of the present invention to improve the known type of shaftless spinning rotors described above such that the danger of damage, particularly to the outlet openings of the gas nozzles, is reduced while maintaining adequate safety against inadmissible rotor deflection.

This object is attained in accordance with the present invention in a shaftless spinning rotor assembly for an open-end spinning machine of the type having an axial field motor including a rotor and a stator, wherein the rotor has a body defining a spinning chamber, an opening into the chamber and a bearing face opposite the rotor opening, and the stator has an opposed facing bearing face. Means are provided for producing a combined magnetic and gas bearing for supporting the rotor relative to the stator including means for producing a first field of magnetic flux for orienting and maintaining a rotational axis of the rotor in a stationary disposition, means for producing a second field of magnetic flux for driving rotation of the rotor about the axis, and means for conducting the magnetic flux for the guiding and driving magnetic fields. According to the present invention, the means for producing the guiding magnetic field comprises magnets concentrically arranged about the rotor axis including a first dynamically balanced magnet unit projecting from one of the two bearing faces and a second corresponding dynamically balanced magnet unit recessed in the opposed bearing face, with the dynamically balanced magnet units being dimensioned to define axial and radial air gaps therebetween.

Because of this arrangement, it is possible to do without a guide ring enclosing the exterior circumference of the rotor. The mechanical guidance of the rotor which is required in extreme cases accomplished by the outwardly projecting magnet unit of the first bearing face in the central area of the axial motor drive. As a result, the air or other gas forming the gas bearing can flow outwardly generally unhindered. It is additionally possible to utilize a larger axial air gap in this central area than between the remaining radially outward bearing faces. Thus, dimensional changes caused by thermal expansion as well as accumulations of dirt and debris have a lesser effect in this area and it is possible to prevent corresponding damage. Furthermore, at any given rotational speed of the rotor, the circumferential speed in the central annular gap, which results between the magnet units of the bearing faces, is clearly less because of the considerably reduced radius than at the outer periphery of the rotor whereat the outer guiding ring of the prior art is situated. As a result it is also possible in the extreme case of mechanical contact resulting between the magnet units to reduce mechanical damage.

The axial dimension of the axial air gap can be varied by selection of the axial extent of the recess in the opposite bearing face relative to the axial extent to which the first magnet unit projects from the one bearing face. It is accordingly possible to optimize the axial air gap to assure sufficient magnetic attraction while preventing any adverse effects from dimensional changes occurring during operation. To prevent damage in the area of the radial annular gap between the magnet units in case of any unintended mechanical contact caused by any radial deflection of the rotor, it is advantageous to form the radially facing surfaces of these magnet units of wear-resistant material. In comparison with the prior art, these wear-resistant surfaces have considerably reduced dimensions.

If the recessed magnet unit is disposed in the stator, it is advantageous to dispose outlet openings for the air or other gas forming the gas bearing to open into the recessed area. As a result, these outlet openings are arranged at a greater distance from the oppositely located bearing surface than would be the case if the bearing surfaces and their associated magnets were situated in common planes. Therefore, the danger of damage to these outlet openings is essentially eliminated since, even if the respective bearing faces or the magnet units directly contact one another, the outlet openings would still be separated from the oppositely located bearing surface by the larger axial air gap.

By disposing the outlet openings annularly in the recessed area of the second magnet unit, the gas (customarily air) is directly blown into the annular radial gap between the magnet units and the bearing faces, whereby a centering air cushion is additionally achieved in this area.

Permanent magnets in a concentric arrangement of guiding and driving magnets are particularly suited for use in the magnet units to effectively exert a combined holding and centering action on the rotor. A yoke is advantageously employed for directing the magnetic flux of the concentric magnet arrangement.

To decouple the magnetic fluxes of the drive magnets and guide magnets, a barrier layer is preferably disposed between them. As a result, the influence of the varying force components of the driving magnetic field is minimized in the area of the guiding magnetic field, whereby it is possible to significantly reduce eddy currents in the rotational frequency of the rotor, particularly at the stator. In particular, an asymmetric magnetization of the central area of the magnetic guide field and thus a displacement of the magnetic axis is prevented. Such a displacement directly leads to a deviation between the mechanical axis of rotation around the center of gravity of the rotor and the magnetic axis which attempts to adjust the rotor to a minimum of the magnetic potential of the field. Any deviation between the two axes would result in wobbling and oscillating movements, which could trigger the danger of frequent mechanical contact between the wear resistant faces of the magnet units.

The disposition of the first magnet unit projecting outwardly of one bearing face of the rotor assembly can be particularly accomplished if the associated yoke lies in essentially the same plane with the main portion of the associated bearing face.

BRIEF DESCRIPTION OF THE DRAWING

The accompanying drawing figure is an axial cross-section through an assembly of a shaftless spinning rotor as preferably embodied according to the present invention as the rotor, i.e., the armature, of an axial field motor as the individual drive of the rotor.

DETAILED DESCRIPTION OF THE PREFERRED EMBODIMENT

Figure 1:
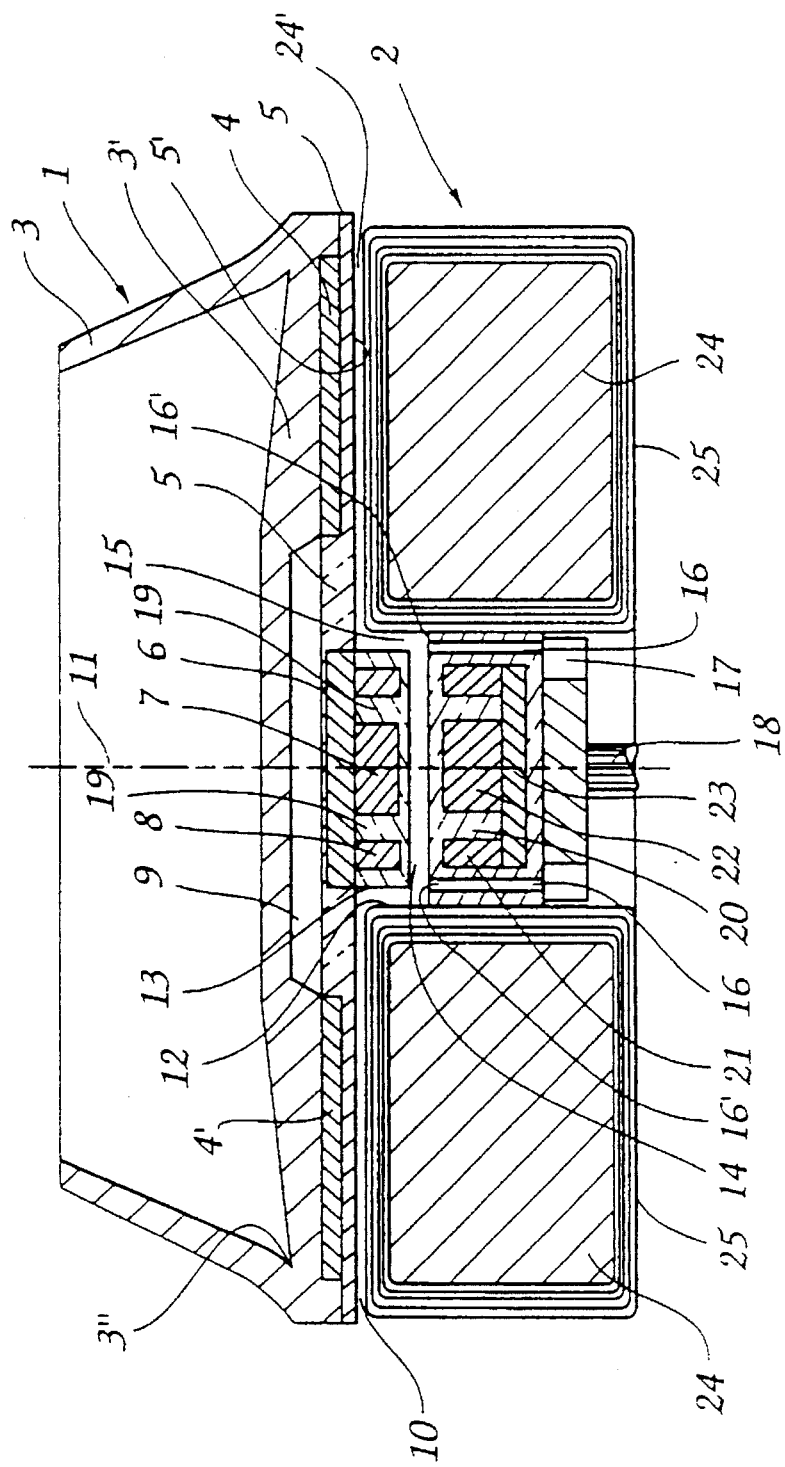

Referring now to the accompanying drawings and to FIG. 1, a shaftless spinning rotor 1 according to the present invention is embodied as the rotor of an axial field motor in assembly with a stator 2 of the motor. The main body of the spinning rotor 1 forms a spinning cup 3 open at its top with a circular disk-like base 3' from which an annular outer wall extends to define a spinning chamber therewithin with an annular fiber collecting groove 3" extending circumferentially at the juncture of the base 3' and the annular wall, this structure of the rotor 3 being concentric about and defining an axis of rotation 11. As is known in open-end spinning, opened individualized fibers are fed into the chamber to collect centrifugally in the groove 3" as a result of driven rotation of the rotor 3 and the collected fibers are progressively drawn from the spinning chamber to form a yarn or thread. The means by which fibers are delivered into the chamber and the means by which the yarn is withdrawn from the chamber are known but are not shown for the sake of simplicity in that elements do not have any influence on the subject of the present invention.

Drive magnets 4 and 4', which by way of example may comprise segmental axially symmetrical magnet plates of alternating polarity, are mounted concentrically about the rotational axis between the underside of the rotor base 3' and a magnet carrier 5 affixed thereto, which forms a bearing face 5' of the rotor. The magnet carrier 5 may be made up for example of solid laminates as known from International PCT Patent Disclosure WO 92/01097. In the simplest case, two drive magnets 4,4' suffice, which are magnetically insulated from one another in the plane of the bearing face 5'. However, since this magnet arrangement is already described in WO 92/01097, it need not be described in further detail herein. An assembly of a centering magnet 7 and a magnet ring 8, supported in spaced relation from one another by an insulating holder 19, is mounted to the underside of the magnet carrier 5 on the spinning rotor 1 to protrude downwardly from the bearing face 5' into a recess of the stator 2, forming therebetween an axial air gap 14 and a radial air gap 15.

Axially adjacent the air gap 14 toward the stator is a corresponding magnet arrangement comprising a central magnet 22 and a ring magnet 21 supported in spaced apart relation to one another by an insulating holder 20. The polarity of the magnets 21 and 22 in the region of the air gap 14 is opposite the polarity of the magnets 7,8 on the rotor side resulting in mutual attraction of the magnets, whereby the magnets create magnetic fields adapted to guide or retain the rotor 1 axially aligned with the stator 2.

Yoke disks 6 and 23 are disposed to extend radially with respect to the magnet assemblies at the sides of the respective magnet assemblies opposed to the air gap 14, for conducting the magnetic fluxes. At least on the side toward the stator, the yoke disk 23 can rest directly on the magnets 21 and 22, because this magnet arrangement is stationary, and accordingly no special demands for retention need to be made of its supporting and insulating layer 20. However, it is also possible on the side toward the rotor to secure the magnets 7,8 to their yoke 6 by an adhesive bond. In that case it is not necessary for a portion of the supporting and insulating layer 19 also to extend between the magnets 7,8 and the yoke 6.

The yoke 6 for the guiding magnetic fields of the spinning rotor 1 is joined to the spinning cup 3 via the aforementioned magnet carrier 5 together with the drive magnets 4,4'. For soft-magnetic short circuiting of the drive magnets 4, 4', the base 3' of the spinning cup 3 is used directly as a yoke for conducting the magnetic flux of the magnets 4,4' and therefore comprises a ferromagnetic material. The drive magnets 4,4' are glued to the rotor base 3'. The yoke 6 for the magnets 7,8 of the guiding magnetic field is spaced axially from the rotor base 3 acting as a yoke for the drive magnets 4,4' by means of a suitably wide air gap 9 to form a barrier layer which is adequate to decouple the driving and guiding magnetic fields from one another. The alternating component of the rotary driving magnetic field therefore has no significant influence on the guiding magnetic field. This decoupling of the magnetic fields not only markedly reduces the production of eddy currents in the region of the rotational axis 11 but also prevents the magnetic and the mechanical axes of rotation from "moving apart" which would lead to oscillation of the rotor 1.

The main component of the stator 2 is a stator winding 25 with an annular soft iron core 24. As already mentioned, the magnet arrangement on the stator side of the magnets 21,22 for the guide magnet fields is provided inside this ring formed by the soft iron core 24 and stator winding 25. Air nozzles 16 open at 16' axially through the holder 20 into the air gap 14 to inject air thereinto. The air nozzles 16 are supplied with air through an annular conduit 17 which communicates with a source of compressed air, not shown, via a connecting line 18. As a result of the outflowing air, the air gap 14 is always maintained appropriately between the spinning rotor 1 and stator 2 counter to the magnetic force of attraction of the magnets 7,8,21,22 for averting direct contact between their opposed bearing faces. The air emerging at 16' from the air nozzles 16 flows from the axial gap 14 annularly into the radial gap 15 and outwardly therefrom radially through an air gap 10 between the rotor 1 and the stator 2, thereby achieving a uniform air cushion over the entire bearing face 5' of the rotor 1. The air pressure and air quantity should be adapted to the magnetic force so that, in the main bearing region, i.e., between the annular arrangement of the stator winding 25 and the opposite face 5' of the spinning rotor 3, the air gap 10 is maintained at a width in the range of a few hundredths of a millimeter. In this manner, the air consumption can be kept within feasible limits, and the magnetic interaction between the spinning rotor 1 and the stator 2 can be maximized, while achieving adequate security against direct contact of the bearing faces.

The air gap 14, which is somewhat wider than the air gap 10, prevents dimensional deviations in the magnet arrangements for the guide magnet fields, resulting for instance from heating due to eddy currents induced by way of harmonics, from having any negative consequences on the operation of the rotor 1. Above all, however, it can be assured that the vulnerable nozzle arrangement of the air nozzles 16 is protected in every case.

The radial air gap 15 is defined by two security faces 12,13 formed respectively as wearproof surfaces on the radially outward surface of the holder 19 and the radially inward surface of the stator 2, to be operative upon startup of the rotor 1 to serve the purpose of radially securing the position of the spinning rotor 1. The security face 12 on the stator is formed by a ring which mainly covers the stator winding. This ring, along with the security face 13, is advantageously formed, for example, of a ceramic material. Above all, it must be assured that the ring constituting the security face 12 is of sufficient structural strength to prevent damage to the stator winding. For example, the ring can be fixed by means of a laminate.

Although normally the guiding magnetic fields reliably assure centering of the spinning rotor 1, a sudden imbalance of the rotor or soiling in the region of the bearing face 5 can cause shifting of the axis of rotation under extreme conditions. In that case, the startup security faces 12,13 assure that the deflection of the rotor will be kept within narrow limits. The annular arrangement of the air nozzles 16 and the emergence of the air into the air gap 15 assure that, beyond the magnetic centering, centering of the spinning rotor takes place without contact of the startup security faces 12,13 with one another.

Compared with a known arrangement of annular startup security faces surrounding the outer periphery of the rotor, the advantage in the present invention is that the peripheral speed of the startup security face 13 on the rotor is markedly lower at the same rpm because of the substantially smaller radius, and accordingly the coefficients of friction are significantly lower than those in the known rotors.

The width of the air gap 14 should not be substantially greater than that of the air gap 10, because of the magnetically insulating properties of the air in the gap 14. However, opposed magnet poles can be expected normally to face one another and there should not be any preconditions for deflecting the magnetic flux by means of some other soft magnetic short circuit. Accordingly, the air gap 9 has a substantially greater magnetic insulative effect than the air gap 14, since the air gap 9 separates self-contained magnetic fields by means of magnetic short circuiting.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A shaftless rotor assembly for an open-end spinning machine comprising an axial field motor including a rotor and a stator, the rotor having a body defining a spinning chamber, an opening into the chamber and a bearing face opposite the rotor opening, and the stator having an opposed facing bearing face, means for producing a combined magnetic and gas bearing for supporting the rotor relative to the stator including means for producing a first field of magnetic flux for orienting and maintaining a rotational axis of the rotor in a stationary disposition, means for producing a second field of magnetic flux for driving rotation of the rotor about the axis, and means for conducting the magnetic flux for the guiding and driving magnetic fields, wherein the means for producing the guiding magnetic field comprises magnets concentrically arranged about the rotor axis including a first dynamically balanced magnet unit projecting from one of the two bearing faces and a second corresponding dynamically balanced magnet unit recessed in the opposed bearing face, the dynamically balanced magnet units being dimensioned to define axial and radial air gaps therebetween.

2. A shaftless spinning rotor assembly in accordance with claim 1, wherein the second magnet unit is recessed into the opposed bearing face to a greater axial extent than the axial extent to which the first magnet unit projects from the one bearing face.

3. A shaftless spinning rotor in accordance with claim 1, wherein the rotor and the stator have wear resistant surfaces which are radially spaced apart by an annular air gap.

4. A shaftless spinning rotor in accordance with claim 1, wherein the second magnet unit is recessed in the bearing face of the stator and the first magnet unit projects from the bearing face of the rotor.

5. A shaftless spinning rotor in accordance with claim 4, and further comprising a plurality of air nozzles opening axially into the axial air gap.

6. A shaftless spinning rotor in accordance with claim 1, wherein the concentrically arranged magnets comprise permanent magnets of opposite polarity disposed in opposition to one another respectively on the rotor and the stator.

7. A shaftless spinning rotor in accordance with claim 6, wherein the permanent magnets on each of the rotor and the stator comprise a central magnet and an annular magnet of opposing polarity disposed at a spacing concentrically thereabout.

8. A shaftless spinning rotor in accordance with one of claims 1, wherein the concentric magnetic arrangement includes a yoke on the rotor facing away from the bearing face.

9. A shaftless spinning rotor in accordance with claim 8, wherein the means for conducting the magnetic flux includes a second yoke, and the yokes are formed as axially spaced disks disposed concentrically to each other.

10. A shaftless spinning rotor in accordance with claim 9, wherein the first-mentioned yoke is disposed in the same plane as the bearing face of the rotor.

11. A shaftless spinning rotor in accordance with claim 1, wherein the concentric magnet arrangement is separated by a barrier layer from the means for conducting the magnetic flux.

* * * * *